United States Patent Office 2,776,312
Patented Jan. 1, 1957

2,776,312

PROCESS FOR THE MANUFACTURE OF 1-p-NI-TROPHENYL-2-AMINO-1,3-PROPANEDIOL OF THREO FORM

Gino Carrara, Milan, Italy

No Drawing. Application October 22, 1951,
Serial No. 252,567

1 Claim. (Cl. 260—570.6)

The present invention relates to the manufacture of intermediates suitable for use in the preparation of chloramphenicol and related or analogous compounds, and more particularly to the manufacture of dl-threo-1-p-nitrophenyl-2-amino-1,3-propanediol.

More specifically, the present invention relates to the preparation of racemic 1-p-nitrophenyl-2-amino-1,3-propanediol of threo form, by starting from the racemic mixture of the erythro and threo forms of 2-acetamino-3-phenyl-1,3-propanediol 1-acetate.

The present application is a continuation-in-part of my prior application Serial No. 171,251, filed January 29, 1950, now Patent No. 2,695,309, dated November 23, 1954.

Various methods of preparing racemic and levo-rotatory chloramphenicol are described in the literature (JACS, July 1949), in issued patents and in certain of my earlier patent applications.

I have found that 1-p-nitrophenyl-2-amino-1,3-propanediol, substantially exclusively of threo form, can be obtained by dissolving a mixture of the erythro and threo forms of the 1-acetate of 2-acetamino-3-phenyl-1,3-propanediol in concentrated sulphuric acid, whereby there is formed, because of the dehydrating action of the acid, the compound 2-methyl-4-acetoxymethyl-5-phenyloxazoline, practically exclusively, followed by nitration in the sulphuric acid solution at a temperature of about −15° to +15° C., whereupon the crude product of the nitration, after extraction, is hydrolyzed with hydrochloric acid which opens the oxazoline ring to form the described threo compound. From the hydrochloride so obtained the free base may be isolated and separated into the optical antipodes according to my co-pending application Ser. No. 132,986, filed December 14, 1949, now abandoned. The solution of the hydrochloride of the above-mentioned racemate, or the solution of the hydrochloride of the levo-rotatory base separated as above, may be converted to racemic chloramphenicol or levo-rotatory chloramphenicol by substitution of hydrogen in the amino group by the dichloracetic residue by a reaction according to Schotten Baumann.

The reactions involved in the process claimed herein may be represented by the following formulae:

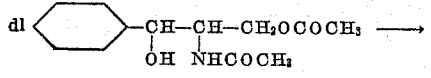

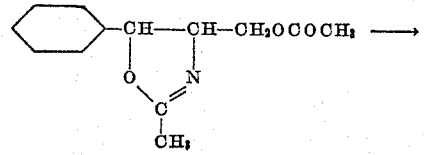

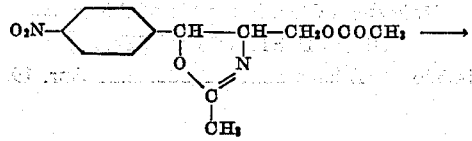

dl-threo-1-p-nitrophenyl-2-amino-1,3-propane-diol

The mixture of erythro and threo forms of 1-acetoxy-2-acetamino-3-phenyl-3-hydroxypropane may be prepared in the manner described in my above-mentioned application Serial No. 171,251, by reducing 1-acetoxy-2-acetamino-3-oxo-3-phenyl propane in 10 parts of methyl alcohol with hydrogen at ordinary temperature and pressure in the presence of 2 parts of palladium-carbon catalyst containing 5% palladium until an absorption of hydrogen of 10% above the theoretical has occurred, the product being then filtered and the alcohol distilled.

The reactions of the present invention are set forth in greater detail in the following example, which is presented for purposes of illustration only and not as indicating the limits of the invention:

Example 201 g. of a racemic mixture of the erythro and threo forms of 1-acetoxy-2-acetamino-3-phenyl-3-hydroxypropane, obtained by reduction of 249 g. of 1-acetoxy-2-acetamino-3-oxo-3-phenylpropane with hydrogen and palladium black, are dissolved in 3 times its weight of concentrated sulfuric acid and the solution is allowed to rest at room temperature for 12 hours.

This solution is poured at a temperature of about −15° C. into three parts concentrated nitric acid of a density of 1.42. It is allowed to rest during about one hour at this temperature and during about half-an-hour at +15° C. It is then poured on ice. It is thoroughly extracted by ethyl acetate after having neutralized it by means of sodium carbonate. After drying the acetic ester extract is distilled. The residue is dissolved in 10 parts of 5% hydrochloric acid and heated in a water bath during two hours. It is then concentrated in vacuum to a small volume and admixed with an equal part of concentrated hydrochloric acid, and the hydrochloride of 1-p-nitrophenyl-2-amino-1,3-propanediol is allowed to crystallize. Its melting point is 177–180° C.

From this hydrochloride the base may be isolated and separated into the two antipodes in accordance with my above-mentioned patent application, Serial No. 132,986.

To convert the hydrochloride of the racemic nitro base, or the hydrochloride of the levo-rotatory nitro base into chloramphenicol, it may be suspended in water and treated, while being actively stirred, with a slight excess of sodium bicarbonate and with the stoichiometric quantity of the chloride of dichloracetic acid (dichloracetyl chloride).

From the reaction mixture, the racemic chloramphenicol or the levo-rotatory chloramphenicol mixed with inorganic salts is separated.

The separated products are filtered and recrystallized from water and are thereby obtained in a condition of sufficient chemical purity.

I claim:

The method of preparing 1-p-nitrophenyl-2-amino-1,3-propanediol of threo form, which comprises dissolving a mixture of the diastereoisomeric forms of 1-acetoxy-2-acetamino-3-phenyl-3-hydroxypropane in concentrated sulfuric acid, reacting the 2-methyl-4-acetoxymethyl-5-phenyloxazoline so obtained in the sulfuric acid solution with fuming nitric acid at a temperature of about −15° to +15° C. until a nitro radical is introduced in the p-position of the phenyl radical, extracting the nitrated product with a water-immiscible organic solvent, and hydrolyzing the nitrated product by heating the same with dilute hydrochloric acid to effect opening of the oxazoline ring with the production of 1-p-nitrophenyl-2-amino-1,3-propanediol of threo form.

References Cited in the file of this patent

UNITED STATES PATENTS

| | | |
|---|---|---|
| 2,114,326 | Adams | Apr. 19, 1938 |
| 2,483,884 | Crooks et al. | Oct. 4, 1949 |
| 2,513,346 | Moersch et al. | July 4, 1950 |

FOREIGN PATENTS

| | | |
|---|---|---|
| 275,968 | Switzerland | Oct. 1, 1951 |
| 501,677 | Belgium | Mar. 31, 1951 |

OTHER REFERENCES

Leffler et al.: "JACS," vol. 59 (1937), pp. 2252–8.
Wiley et al.: "Chem. Revs.," vol. 44 (1949), pp. 452–5.
Richter's "Org. Chem.," vol. IV (1947), Elsevier Pub. Co., p. 137.